Patented Oct. 14, 1952

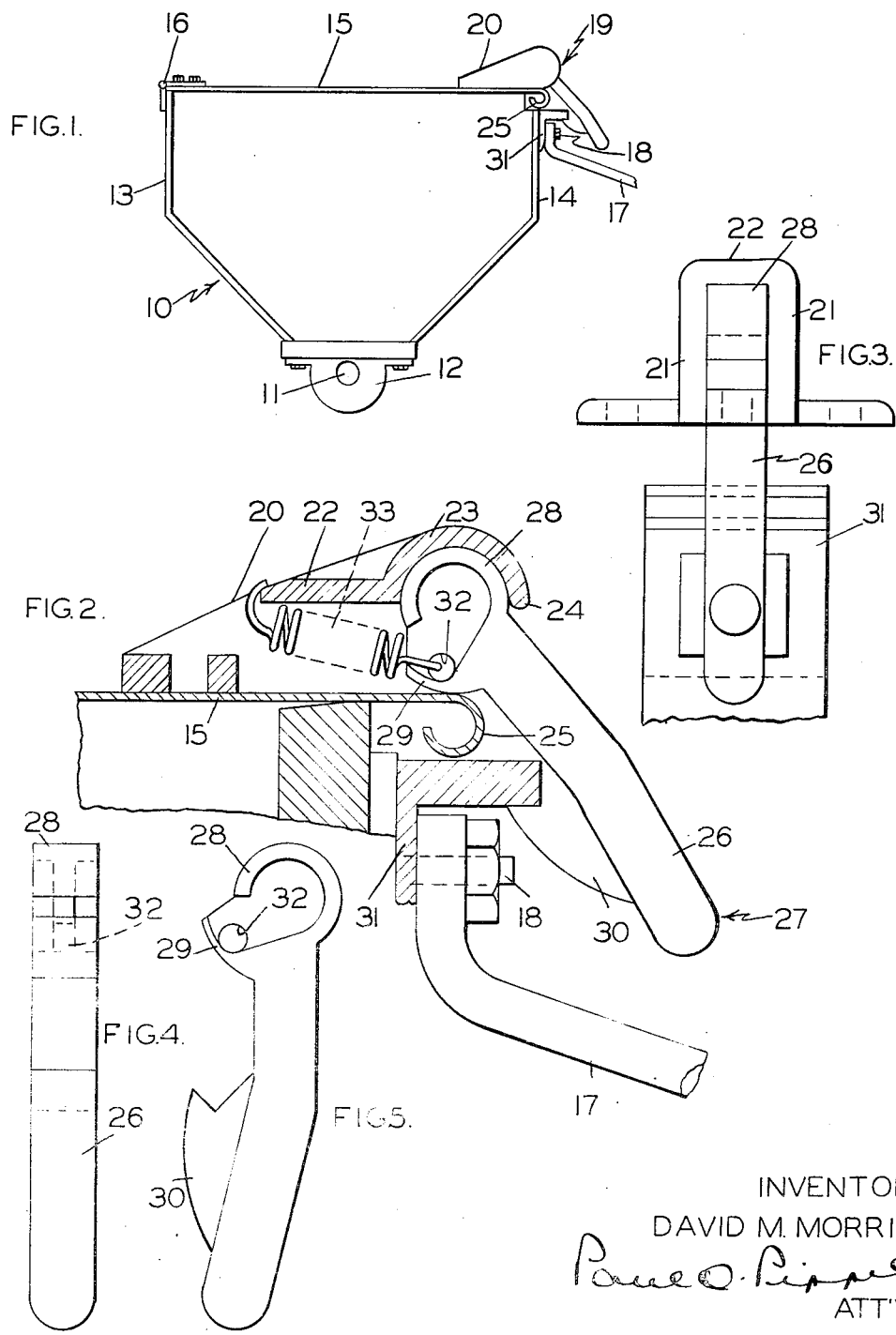

2,613,969

UNITED STATES PATENT OFFICE 2,613,969

COVER FASTENER

David M. Morris, Richmond, Ind., assignor to International Harvester Company, a corporation of New Jersey Application November 3, 1949, Serial No. 125,330

3 Claims. (Cl. 292—128)

This invention relates to a closure fastener and particularly a fastener for the lid of a fertilizer hopper or the like. An object of the invention is to provide a simply constructed, easily assembled latch mechanism for securing the lid of a grain or fertilizer hopper to the wall of the receptacle.

Another object of the invention is to provide for the lid of a receptacle a simply constructed latch mechanism which may be swung in opposite directions to open and close the latch, wherein the latch pivot is provided solely by the frictional engagement of the latch head in the latch housing.

The latch of the present invention is shown and described in its application to a fertilizer box of the elongated type adapted to extend transversely of the direction of travel of the machine upon which the box is carried, such as a lime sower. Simplicity and strength of construction are prime requisites in an implement of this type. The construction of the latch is very important in that it is often necessary in emptying and cleaning the fertilizer hopper that it be turned upside down on the ground and the latch must therefore be built to withstand rough treatment.

Other objects and advantages of the invention will become clear from the following detailed description when read in conjunction with the accompanying drawings wherein:

Fig. 1 is a diagrammatic view in end elevation of a lime sower box having a fastener thereon embodying the features of the present invention.

Fig. 2 is a view partly in section of the fastener of this invention attached to the fertilizer box;

Fig. 3 is a front elevation of the structure shown in Fig. 2;

Fig. 4 is a view in front elevation of the latch means; and

Fig. 5 is a side elevation of the latch member.

Referring to the drawings, a lime sower receptacle designated by the numeral 10 has conventional agitating and dispensing equipment (not shown) incorporated therein. The agitating and dispensing equipment is driven by a shaft 11 which is supported in bearings 12 and extends lengthwise of the box. The fertilizer box is provided with side walls 13 and 14 and a cover or lid member 15 which is hinged to the wall 13 as at 16. One of the braces by which the fertilizer box is supported upon the propelling machine is shown at 17, the upper end of the latter being secured to the box by a bolt 18.

The lid 15 of the fertilizer box is releasably secured to the receptacle by closure fastener means 19 which comprises a casing or housing 20 suitably secured to the lid 15. Housing 20 comprises side walls 21 and a top or cap 22. Cap 22 is shown in section in Fig. 2 and is provided with a socket portion 23 semi-cylindrical in shape.

The marginal edge 24 of the semi-cylindrical portion 23 of the cap is spaced from the curved end 25 of the lid 15 forming an opening through which projects the shank 26 of the latch member 27 having a rounded head 28 receivable in and mating with the socket portion 23 of the cap 22. The head 28 of the latch is somewhat greater in diameter than the spacing between the marginal edge 24 and the end 25 of the lid so that the latch is not readily displaced and these marginal edges serve as limiting means for swinging of the latch 27 about its pivot in the socket 23.

The head 28 of the latch is provided with a lip or projection 29. Lip 29 serves as a cam and has an arcuate outer surface adapted to engage the upper surface of the lid 15 and urge the head 28 into the socket 23. Secured to the underside of the shank portion 26 of the latch is a hook 30 adapted to engage a strike in the form of an angle member 31 secured to the wall 14 of the fertilizer box by the bolt 18. It will be observed, of course, that swinging of the shank 26 of the latch outwardly and upwardly releases the hook member 30 from the strike and allows opening of the box lid.

The projection 29 on the head 28 of the latch forms a lever arm having an opening 32 therein for the reception of one end of a spring 33, the other end of which is anchored to the top 22 of the housing. Spring 33 acts to bias the latch 27 into locking engagement of hook 30 with the strike 31 and cooperates with cam portion 29 to retain the latch head in the socket.

From the foregoing description it will be noted that applicant has devised a novel closure fastener wherein no pivot is provided for the latch other than that provided by the rotation of the latch head 28 in the socket 23. The latch head is securely held between the lid and the housing and the spring 33 tends to retain the latch head in the housing.

It is believed that the closure fastener for the fertilizer box described herein and the operation thereof will be clearly understood from the foregoing. It is to be understood, of course, that modifications may be made in the invention without departing from the spirit thereof or the scope of the appended claims.

What is claimed is:

1. A latch mechanism for the lid of a fertilizer hopper or the like and adapted for use with a strike to secure the lid to the hopper body, comprising a housing mounted on the lid having a semi-cylindrical socket portion spaced from the lid, a latch member having an elongated body, a head having a semi-cylindrical portion receivable in and mating with said socket portion for rotation therein and an arcuate lip portion circumferentially spaced from and on a longer radius than the semi-cylindrical portion and engaging the lid to retain the semi-cylindrical portion in its socket, and a spring attached to the housing and to said lip portion for urging the latch member to a position with said lip in engagement with the hopper lid and cooperating with said lip portion to retain the head in said socket.

2. A latch mechanism for the lid of a receptacle and adapted for use with a strike to secure the lid to the main body of the receptacle, comprising a latch member having an elongated shank and an enlarged head, a housing on the lid having a socket to rockably receive the latch head and an opening formed by the spacing of the marginal edge of the housing from the lid to receive the shank, said opening being sufficient in size to accommodate limited swinging of the latch while retaining the head against displacement from the housing, means on the shank engageable with the strike for fastening the lid, a cam portion on the head engageable with the lid to urge the head into said socket when the latch member is swung to latching engagement with the strike, and a spring anchored to the housing and connected to the latch member for urging the cam portion of the head thereof into engagement with the lid to retain the head in said socket and for urging the shank into operative engagement with the strike.

3. A latch mechanism for the lid of a fertilizer hopper or the like and adapted for use with a strike to secure the lid to the hopper body, comprising a housing mounted on the lid having a semi-cylindrical socket portion spaced from the lid, a latch member having an elongated body projecting from the housing and a head having a semi-cylindrical portion receivable in and mating with said socket portion for rotation therein, and means for retaining said semi-cylindrical portion of the head in the socket including an arcuate lip portion on the head on a longer radius than said semi-cylindrical portion and engageable with the hopper lid to urge the semi-cylindrical portion of the head into the socket, and a spring attached to said housing and to said lip portion for urging the latter into engagement with said lid and retaining said semi-cylindrical portion in said socket.

DAVID M. MORRIS.

REFERENCES CITED

The following references are of record in the file of this patent:

UNITED STATES PATENTS

| Number | Name | Date |
|---|---|---|
| 294,778 | Ford et al. | Mar. 11, 1884 |
| 1,715,300 | Maris | May 28, 1929 |